United States Patent [19]
Gnauck et al.

[11] Patent Number: 5,303,079
[45] Date of Patent: Apr. 12, 1994

[54] TUNABLE CHIRP, LIGHTWAVE MODULATOR FOR DISPERSION COMPENSATION

[75] Inventors: Alan H. Gnauck, Middletown; Steven K. Korotky, Toms River; Jane E. Zucker, Aberdeen, all of N.J.

[73] Assignee: AT&T Bell Laboratories, Murray Hill, N.J.

[21] Appl. No.: 865,567

[22] Filed: Apr. 9, 1992

[51] Int. Cl.⁵ .............................................. H04B 10/04
[52] U.S. Cl. ........................................ 359/188; 385/8
[58] Field of Search ............... 359/125, 161, 173, 180, 359/181, 188; 385/2, 8, 24

[56] References Cited

U.S. PATENT DOCUMENTS

| | | | |
|---|---|---|---|
| 5,031,235 | 7/1991 | Raskin | 359/125 |
| 5,101,450 | 3/1992 | Olshansky | 359/188 |

FOREIGN PATENT DOCUMENTS

| | | | |
|---|---|---|---|
| 0207800 | 7/1982 | European Pat. Off. | 359/188 |
| 0223837 | 9/1989 | Japan | 359/188 |

*Primary Examiner*—Leslie Pascal
*Attorney, Agent, or Firm*—Gregory C. Ranieri

[57] ABSTRACT

External modulation is accomplished in a dual waveguide device wherein substantially identical input optical beams are supplied to the waveguides and wherein each waveguide through its electrode is subject to individual, mutually exclusive control. Modulation signals are applied to each waveguide via its separate electrode. Control signals are applied to each waveguide for adjusting the modulation chirp parameter to a desired fixed, non-zero value. Typically, the desired value of the chirp parameter is one which provides the lowest fiber dispersion penalty for the system. Modulated lightwave signals emerging from the waveguides are combined to form a single output signal suitable for transmission over an optical fiber. In one embodiment, Mach-Zehnder interferometer having separately controllable waveguides has its input coupled to a CW laser. Both III-V semiconductor and Ti:LiNbO₃ Mach-Zehnder interferometers have been utilized as external modulators in accordance with the principles of the present invention.

10 Claims, 5 Drawing Sheets

DRIVE AND DETECTED WAVWFORMS

DRIVE AND DETECTED WAVWFORMS

TUNABLE CHIRP, LIGHTWAVE MODULATOR FOR DISPERSION COMPENSATION

TECHNICAL FIELD

This invention relates to lightwave communication systems and, more particularly, to modulation devices for use in such systems.

BACKGROUND OF THE INVENTION

Long haul fiber transmission systems have historically been limited by such factors as fiber loss, fiber dispersion, fiber nonlinearities, and amplifier noise. With the advent of practical optical amplifiers, these systems are effectively no longer subject to loss limitations. Rather, the significant system limitation has become dispersion. Present fiber optic transmission systems use transmitters employing direct current modulation of laser diodes. When modulated, these lasers produce pulses exhibiting large, uncontrolled wavelength shifts called "chirp." In the presence of a dispersive medium such as an optical fiber, the chirped pulses can be severely distorted when they finally reach a remote receiver.

System limitations imposed by dispersion may be countered by the use of dispersion-shifted fiber, "zero-chirp" transmitters, dispersion equalization, and soliton propagation. The use of dispersion-shifted fiber attempts to minimize dispersive loss within the transmission band whereas the use of zero-chirp transmitters attempts to maintain the transmission wavelength constant, preferably at the attenuation loss minimum for the fiber. Dispersion equalization, both at the receiver and at the transmitter, has been utilized to substantially compensate for the effects of dispersion on the transmitted pulses. Soliton propagation is dependent upon the presence of small amounts of dispersion at the transmission wavelength.

In the prior art, zero-chirp transmitters have been developed to ameliorate the problem caused by chirped pulses transmitted at high bit-rates over dispersive optical fiber. Generally, the term chirped pulses refers to pulses those whose wavelength swings dynamically about a central wavelength. The amount of chirp varies randomly as the transmitter operates thereby causing the chirped pulses to incur penalties in such systems. These penalties involve additional loss which limits the maximum transmission length or maximum transmission bandwidth due to intersymbol interference in the transmitted data pulses. In conventional optical fiber, the wavelength at which the fiber loss minimum occurs does not necessarily coincide with the wavelength at which zero dispersion occurs. Thus, when the lightwave transmitter produces optical pulses at a particular wavelength corresponding to the loss minimum of the fiber, wavelength chirping of the pulses causes pulse spreading because different wavelength components of the pulses experience different amounts of dispersive delay. Dispersion is higher for wavelength components of the pulses not at the zero dispersion wavelength. By removing chirp from the transmitted pulses, it has been thought possible to produce pulses with the minimum spectral width substantially at a single desired wavelength using a zero-chirp transmitter and thereby assure that only a small amount of pulse spreading is experienced. In general, such zero-chirp transmitters include an external modulator coupled to a laser. One external modulator which has been proposed is a lithium niobate, Mach-Zehnder interferometer using push-pull drive signals on the separate arms of the interferometer. See, for example, Koyama et al., *J. Lightwave Technol.*, Vol. 6, No. 1, pp. 87 et seq. (1988) and Namiki et al., *Proc. of Seventh International Conf. on Integrated Optics and Optical Fiber Communication*, paper 19D4-2 (1989).

While the zero-chirp transmitter offers a potentially attractive solution for high bit-rate transmission at a wavelength "in the" optical fiber exhibiting non-zero dispersion, better performance has been predicted by using pulse compression techniques in the transmitter to achieve a dynamically varying chirp in a broad negative region. See Koyama et al., *J. Lightwave Technol.*, Vol. 6, No. 1, FIG. 8, p. 91 (1988). Subsequent to this prediction, however, the art continues to express the need for lowering the transmitter chirp to zero as the method for combatting dispersion when communicating away from the zero dispersion wavelength of the optical transmission fiber. See, Okiyama et al., *J. Lightwave Technol.*, Vol. 6, No. 11, p. 1686, 1691 (1988).

SUMMARY OF THE INVENTION

External modulation of lightwave signals is controlled in order to minimize the transmission power penalty caused by chromatic dispersion in an optical fiber transmission system by adjusting a modulation chirp parameter to any substantially fixed value in a predetermined, controllable manner. External modulation is accomplished, for example, in a dual waveguide device wherein substantially identical input optical beams are supplied to the waveguides and wherein each waveguide is subject to its own individual, mutually exclusive control. Modulation signals are applied to each waveguide via the separate control. Moreover, control signals are applied to each waveguide for adjusting the modulation chirp parameter to a desired non-zero, substantially fixed value. Typically, the desired value of the chirp parameter is one which provides the lowest fiber dispersion penalty for the system. Modulated lightwave signals emerging from the waveguides are combined to form a single output signal suitable for transmission over an optical fiber.

In one embodiment, a Mach-Zehnder interferometer having separately controllable waveguides has its input coupled to a CW laser. Drive signals to the electrodes over each of the waveguides are generated to create a sufficient depth of modulation, a proper operating point for the modulator, and a desired value for the modulation chirp parameter. By using peak-to-peak voltage differences on each waveguide, it is possible to represent the value of the modulation chirp parameter as the sum divided by the difference of the individual peak-to-peak voltage differences. Both III-V semiconductor and Ti:LiNbO$_3$ Mach-Zehnder interferometers have been realized.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Electrooptic external modulators for optical signals are known to operate with a very low amounts of chirp. In fact, Mach-Zehnder interferometer waveguide modulators have recently been designed to operate chirp-free. Chirp-free modulation has been thought desirable to overcome the transmission limitations imposed by fiber dispersion. However, it has been shown by us that the lowest fiber dispersion penalty is not necessarily obtained for a chirp parameter identically equal to zero. For example, we have shown this to be true for systems operated at 1.5 μm. using a fiber having a zero dispersion wavelength of approximately 1.3 μm. As described below, it is shown that choosing a non-zero modulation chirp parameter $\alpha_m$ dependent on the fiber dispersion coefficient and fiber transmission distance is advantageous because of the pulse compression provided.

Figure 1:
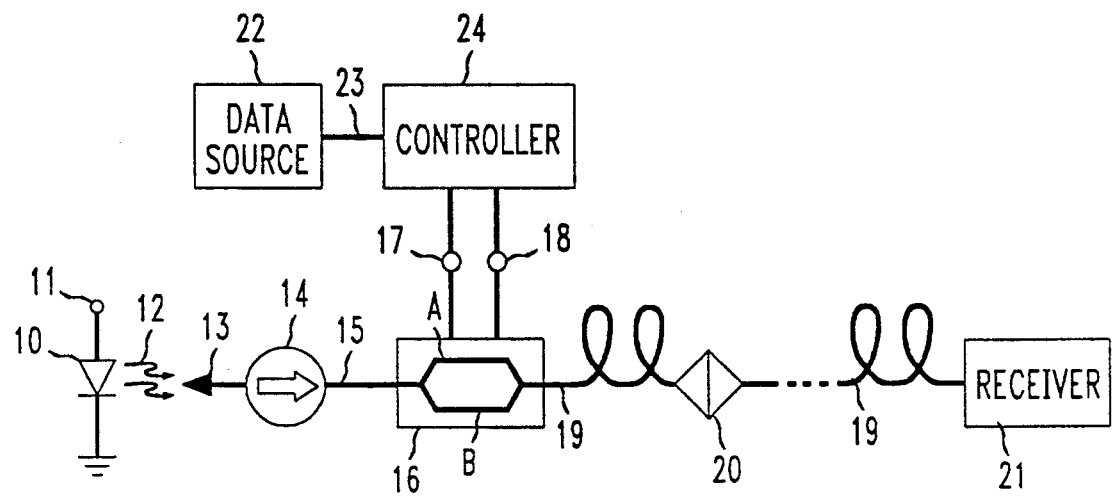
FIG. 1 shows a simplified lightwave transmission system including the transmitter realized in accordance with the principles of the present invention.

A lightwave transmission system is shown in FIG. 1 including a transmitter, a receiver, and a transmission medium connecting the transmitter to the receiver. The transmitter includes laser 10, lensed optical fiber 13, isolator 14, external modulator 16, controller 24, and data source 22. The transmission medium is shown as lengths of optical fiber 19 interconnected with optical amplifiers 20, so that the combinations of fibers and amplifiers are sufficient to span the distance between the transmitter and receiver 21.

In the lightwave transmitter shown in FIG. 1, laser 10 produces optical signals 12 at a predetermined transmission wavelength for the lightwave transmission system. Laser 10 is operated in a continuous wave (CW) mode or pulsed mode by applying the proper signal to terminal 11 of the laser. For long wavelength systems, laser 10 is typically an InGaAsP/InP semiconductor single mode laser operating nominally at 1.5 μm, for example. Output optical beam 12 from the laser is coupled into a lensed optical fiber 13 usually called a fiber pigtail. Lensed optical fiber 13 facilitates coupling of the optical beam from the laser to the external modulator.

Isolator 14 is positioned between lensed optical fiber 13 and the external modulator as an in-line element to reduce reflections toward the laser from the rest of transmission system. Isolator 14 can also be combined with a polarizer (not shown) to assist in further reduction of reflections back toward the laser. While isolator 14 is shown in the transmitter arrangement of FIG. 1, it should be noted that the isolator is an optional, rather than a necessary, element in the realization of the transmitter.

External modulator 16 receives optical signals 12 from the laser via input fiber 15. The external modulator includes two separate waveguides which are independently controllable via controller 24. At the input of the external modulator, optical signals from the laser are coupled into each of the waveguides labeled as waveguide A and waveguide B in FIG. 1. At the output of external modulator 16, the modulated optical signals from each waveguide are combined into a single optical signal for transmission over the optical fiber transmission medium. Modulation performed by modulator 16 on optical signals 12 is either amplitude modulation or intensity modulation.

Controller 24 receives a digital data signal from data source 22 via lead 23. Controller 24 generates modulation control signals output to external modulator 16 via leads 17 and 18. Modulation control signals from controller 24 are supplied via leads 17 and 18 to control characteristics of waveguides A and B, respectively, so that the data from data source 22 is properly modulated onto the optical signals at the transmission wavelength in the waveguides and so that the desired modulation chirp parameter value is generated in the resulting modulated optical signals. For example, the control signals can adjust the relative propagation velocities of each of the waveguides to permit the desired modulation chirp parameter value to be achieved in accordance with the principles of the invention.

The transmission medium includes a plurality of lengths of optical fiber together with optical amplifiers 20. Optical amplifiers 20 are, for example, erbium doped optical fiber amplifiers for amplifying the modulated optical signals as the propagate along the optical fibers 19. Optical fiber 19 is either a standard silica-based fiber having a loss minimum in the vicinity of 1.3 μm. or a dispersion shifted fiber having its loss minimum in the vicinity of 1.5 μm. The transmission medium is of sufficient length to span the distance from the transmitter to lightwave receiver 21.

Lasers, lensed fiber couplers, isolators, polarizers, data sources, externals modulators, optical fibers, optical amplifiers, and lightwave receivers are commercially available and well known to persons skilled in the art.

Figure 2:
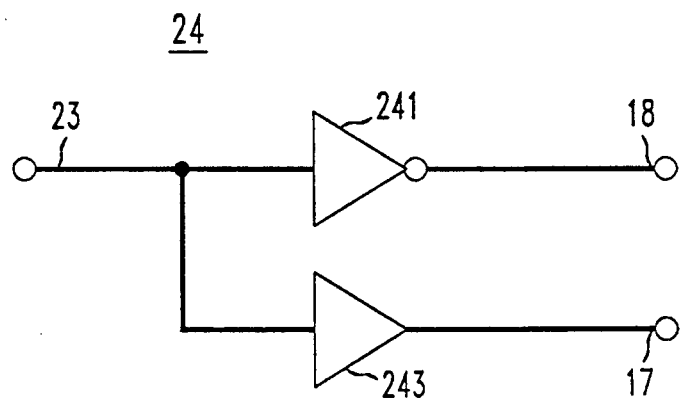
FIG. 2 shows a simplified schematic diagram for the controller in FIG. 1.

In an example from experimental practice, a waveguide Mach-Zehnder interferometer (FIG. 3) is used for external modulator 16 and an amplifier arrangement (FIG. 2) is utilized for controller 24. As shown in FIG. 2, exemplary controller 24 comprises gain-adjustable amplifiers 241 and 243 whose inputs are coupled together to receive the digital data on lead 23. Each amplifier can vary the peak-to-peak amplitude swing of the digital data at its output. Amplifier 241 is shown as an inverting amplifier. Such a function is not necessary to the practice of the invention. Moreover, phase control elements (not shown) such as adjustable delay lines are contemplated for use with one or both of the amplifiers, either preceding or following a particular amplifier. Such phase control elements permit the modulation control signal output on lead 17 to have a different phase relative to that of the modulation control signal on lead 18.

Figure 3:
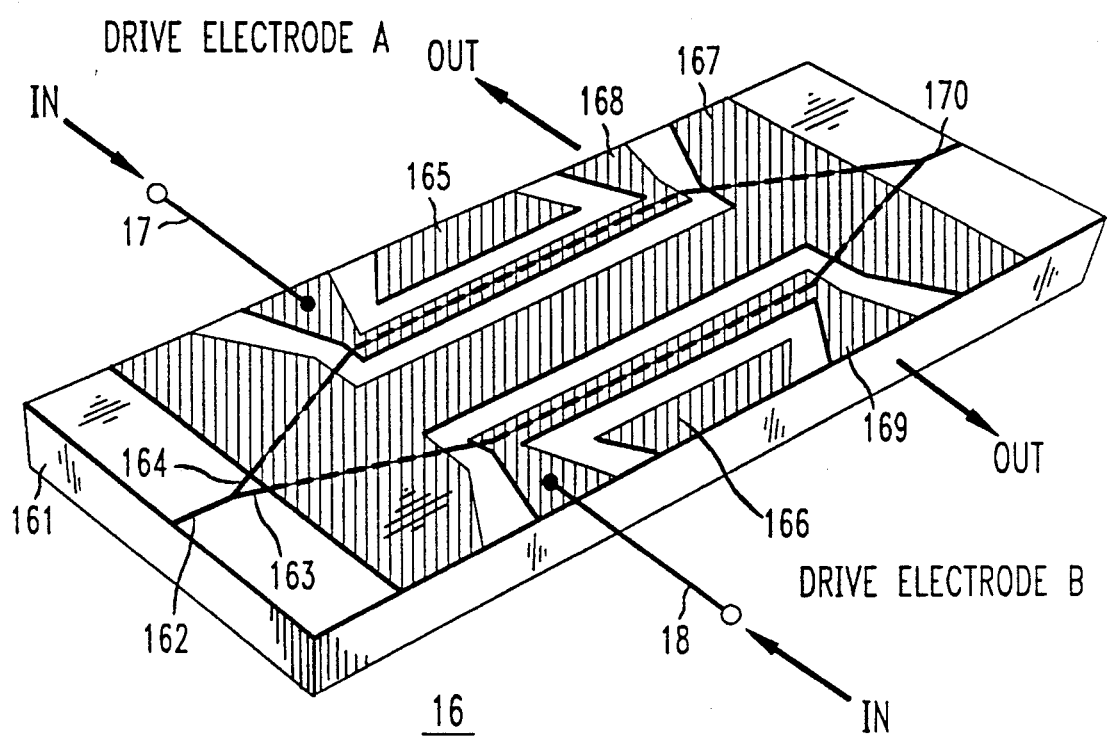
FIG. 3 shows a simplified perspective view of an exemplary external modulator for use in the system shown in FIG. 1.

Exemplary external modulator 16 shown in FIG. 3 utilizes titanium in-diffused waveguides 162, 163, 164, and 170 in a 1×1 Y-branch Mach-Zehnder interferometer configuration on a lithium niobate substrate 161. Ground planes 165, 166, and 167 are disposed to maintain electrical isolation between drive electrodes 168 and 169 and to insure that the drive electrodes control their respective waveguides independent of each other. As a result, waveguides 164 and 163 are individually addressable via drive electrodes 168 and 169, respectively. The drive electrodes are of the travelling-wave or lumped-element type. Drive electrode 168 connected to lead 17 is disposed over a portion of waveguide 164 (waveguide "A") whereas drive electrode 169 connected to lead 18 is disposed over a portion of waveguide 163 (waveguide "B"). In the interferometer waveguide structure, an input Y-branch couples the optical signal in waveguide 162 into both coplanar strip waveguides 163 and 164 while output Y-branch couples the optical signals from coplanar strip waveguides 163 and 164 into a single waveguide 170.

Each optical waveguide is designed using standard techniques for single mode operation at the transmission wavelength (e.g., 1.5 μm). For the external modulator shown in FIG. 3, the waveguides were produced by diffusion of titanium z-cut $LiNbO_3$ so that the two arms of the interferometer are separated by a distance of 250 μm, which is approximately 15 times the gap spacing used between the coplanar waveguide electrodes. The electrodes are formed using standard metallic plating techniques (e.g., gold plating). Although not shown, a silicon dioxide buffer layer is deposited or grown between the waveguides and the corresponding electrodes. Thicknesses of the buffer layer and electrodes, width of the electrodes, and size of the interelectrode gap are selected using standard techniques to realize a modulator having broad bandwidth and low $V_\pi$, where $V_\pi$ is the voltage necessary to achieve a $\pi$-phase shift. For a discussion of design techniques for these types of devices, see *Optical Fiber Telecommunications II*, pp. 421–65 (S. Miller et al. ed. 1988) and S. K. Korotky, *Technical Digest, Workshop on Numerical Simulation and Analysis in Guided-Wave Optics and Optoelectronics*, paper SF2 (1989). Impedance of the electrodes 168 and 169 has been measured as approximately 43Ω where the active length of the electrode is approximately 4 cm. An end-to-end center conductor resistance has been measured as approximately 7.9Ω.

In order to assure low optical return loss below approximately −60 dB, waveguide ends in external modulator 16 were polished in plane at an angle of 6° from the normal with respect to the waveguide longitudinal axis. Fibers 15 and 19 had their mating end faces polished at the corresponding Fresnel angle of 8° 52'.

In accordance with the principles of this invention, a modulation chirp parameter for modulator 16—rather than being allowed to be randomly varying or attempted to be made zero as in the prior art—is adjusted to a substantially fixed, non-zero value in a predetermined, controllable manner. The desired value of the modulation chirp parameter is typically one which provides the lowest fiber dispersion penalty for the system. Herein, modulation chirp parameter $\alpha_m$ represents the ratio of phase modulation to amplitude modulation as performed by external modulator 16. The modulation chirp parameter may be expressed as follows: $\alpha_m = (d\phi/dt)/(dI/dt)/2I$, where t denotes time and $\phi$ and I are the instantaneous phase and intensity of the optical output from external modulator 16. Generally, the modulation chirp parameter is a function of the type of modulation, the modulation depth, and the operating point of the optoelectronic transducer being used for the transmitter. For the Mach-Zehnder external modulator shown in FIG. 3, which is (1) based on the linear electrooptic effect, (2) biased midway on its switching curve, and (3) driven by mathematically similar drive waveforms, $\alpha_m$ is written in terms of modulated optical phase velocities for the optical signals in each arm (waveguide "A" or waveguide "B") of the interferometer. The phase velocities are written as $\Delta\beta_A$ and $\Delta\beta_B$ for the two different arms of the interferometer. As a result, modulation chirp parameter is equal to $(1+r)/(1-r)$, where $r = \Delta\beta_B/\Delta\beta_A$. It is the function of controller 24 to adjust the ratio r so that a particular value of the modulation chirp parameter is achieved. As such, the controller adjusts the modulation chirp parameter by choosing unique peak-to-peak applied drive voltages so that in the small signal limit $\alpha_m = (\Delta V_A + \Delta V_B)/(\Delta V_A - \Delta V_B)$. While this expression is derived for the Mach-Zehnder configuration in the small signal regime, it is accurate for relatively large values of modulation depth. From the description above, it is now understood that, by modifying the digital data signal appropriately in the controller to generate drive signals having the proper relative magnitude and sign of their amplitudes, it is possible to achieve modulation chirp parameters in the range from $-\infty < \alpha_m < +\infty$.

The capability of obtaining controlled and arbitrarily adjustable values of the modulation chirp parameter is demonstrated in FIGS. 4–7. With respect to these figures, a shorthand notation has been introduced for the waveguides and electrodes in which the subscript A refers to waveguide 164 or the drive signals applied to electrode 168 and the subscript B refers to waveguide 163 or the drive signals applied to electrode 169. The curves shown in each of these figures represent the drive waveforms, $V_A$ and $V_B$, generated by controller 24, the approximate voltage difference between the drive waveforms, and the optical intensity of the modulated signal output by external modulator 16. In each of FIGS. 4 through 7, the drive waveforms are at approximately 2.5 GHz in various voltage ratios.

Figure 4:
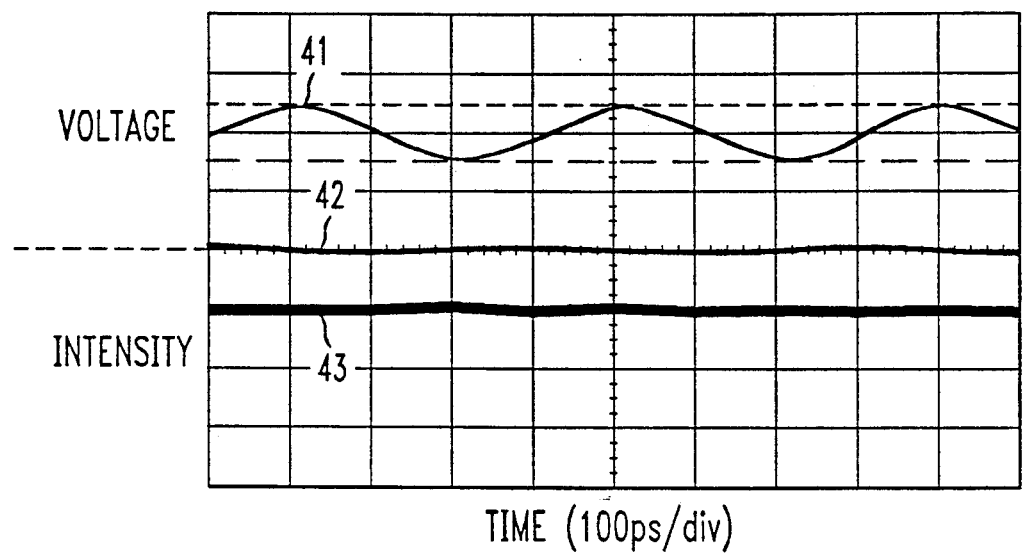
FIGS. 4-7 show exemplary drive voltage waveforms and intensity waveforms for the controller and external modulator in FIGS. 1-3.

In FIG. 4, pure phase modulation is obtained with $r = 1$ ($\alpha_m = \infty$). In order to obtain pure phase modulation with a modulation index of unity, electrodes 168 and 169 receive drive voltages from controller 24 which were in phase and which individually exhibited a peak-to-peak voltage swing corresponding to a $\pi$ phase shift. Curve 41 shows the drive signals to the two waveguides being substantially in phase and having the appropriate voltage swings so that $\Delta V_A = \Delta V_B = V_\pi$. Curve 42 shows a negligible oscillation in the voltage difference between the drive voltages as approximately $V_B - V_A$. As expected, curve 43 shows a substantially constant output intensity due to pure phase modulation in the external modulator.

Figure 5:
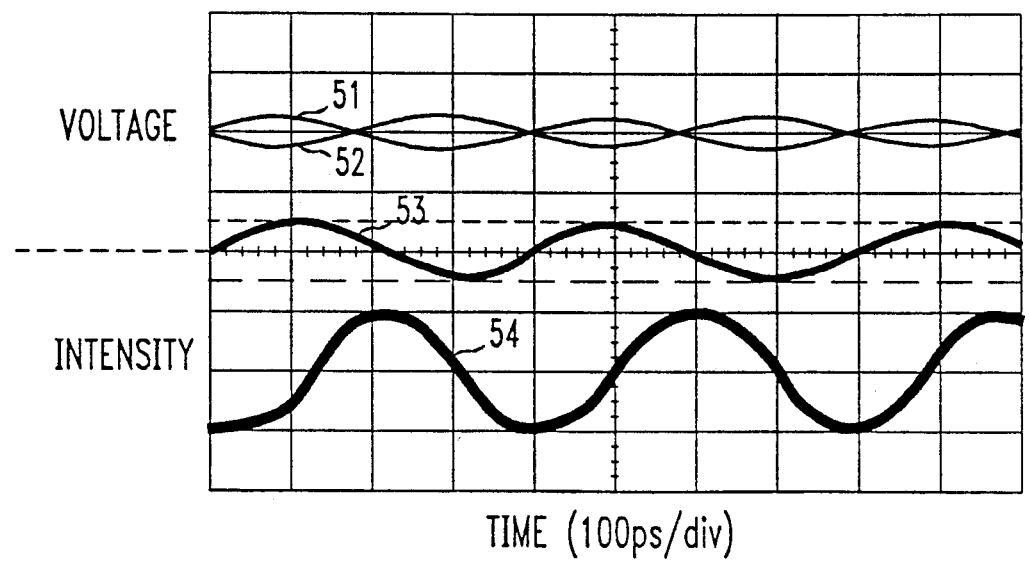

Pure amplitude modulation is shown in FIG. 5 wherein the ratio r is equal to negative one and the modulation chirp parameter is approximately zero. Pure amplitude modulation is achieved with the drive waveforms being the negative (complement) of each other, as shown by curves 51 and 52. This corresponds to the condition where $\Delta V_A = -\Delta V_B = V_\pi/2$. The voltage difference between the drive waveforms oscillates in a periodic manner as shown in curve 53. Curve 54 shows the optical intensity oscillating between a high level and a low level corresponding, for example, to an alternating pattern of binary zeroes and ones.

Figure 6:
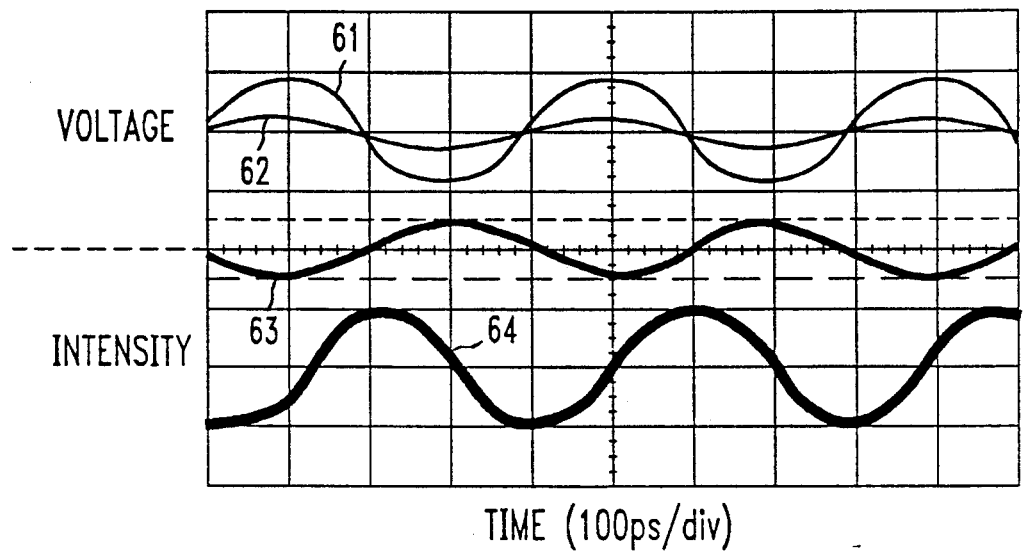

FIG. 6 depicts the case of combined amplitude and phase modulation where the ratio r is approximately equal to ⅓ and the corresponding modulation chirp parameter is approximately 2. The drive waveforms are substantially in synchronism but exhibit different peak-to-peak voltages as shown by curves 61 and 62. The drive waveforms generated by controller 24 satisfy the following conditions: $\Delta V_A = 3V_\pi/2$ and $\Delta V_B = V_\pi/2$. The optical intensity shown in curve 64 is dominated by amplitude modulation as the intensity switches between a logically high state and a logically low state.

Figure 7:
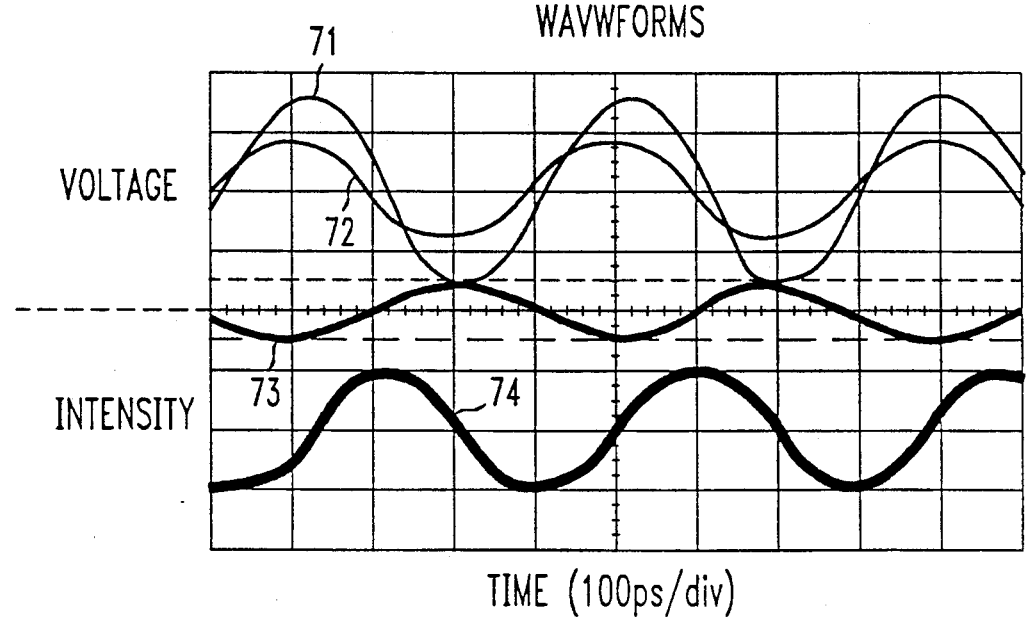

FIG. 7 also depicts the case of combined amplitude and phase modulation. The resulting curves 71 through 74 are similar to those shown in FIG. 6. In FIG. 7, the ratio r is approximately equal to 3/5 so that the modulation chirp parameter value is approximately 4. The drive waveforms generated by controller 24 satisfy the following conditions: $\Delta V_A = 5V_\pi/2$ and $\Delta V_B = 3V_\pi/2$.

In a different experiment, the same external modulator was responsive to a 5 Gb/s pseudorandom non-return-to-zero (NRZ) digital data signal from the data source. The modulation chirp parameter value was varied by having the controller change the relative peak-to-peak drive signal voltages and their relative polarities. Particularly, it was determined that chirp values between −2.0 and +2.0 were desirable. In order to achieve chirp values in this range and simultaneously permit a modulation depth of approximately 100%, $|\Delta V_A - \Delta V_B|$ is held constant to a value of approximately 4 V while $|\Delta V_A + \Delta V_B|$ is varied between 0 V and 8 V. It was found that positive values of the chirp parameter led to additional dispersion penalty for transmission at 1.53 μm over 256 km of standard optical fiber (zero dispersion wavelength of 1.3 μm). As the controller varied the drive signals to produce negative values of the modulation chirp parameter, pulse broadening was mitigated at the dispersion penalty was minimized. Over 128 km of fiber, transmission using a chirp parameter of approximately −0.8 reduced the dispersion penalty by 0.7 dB as compared with chirpless modulation. It is contemplated that this technique may be used with return-to-zero (RZ) pulses. In the latter case, the technique is expected to provide identical chirp for each data time slot.

Figure 8:
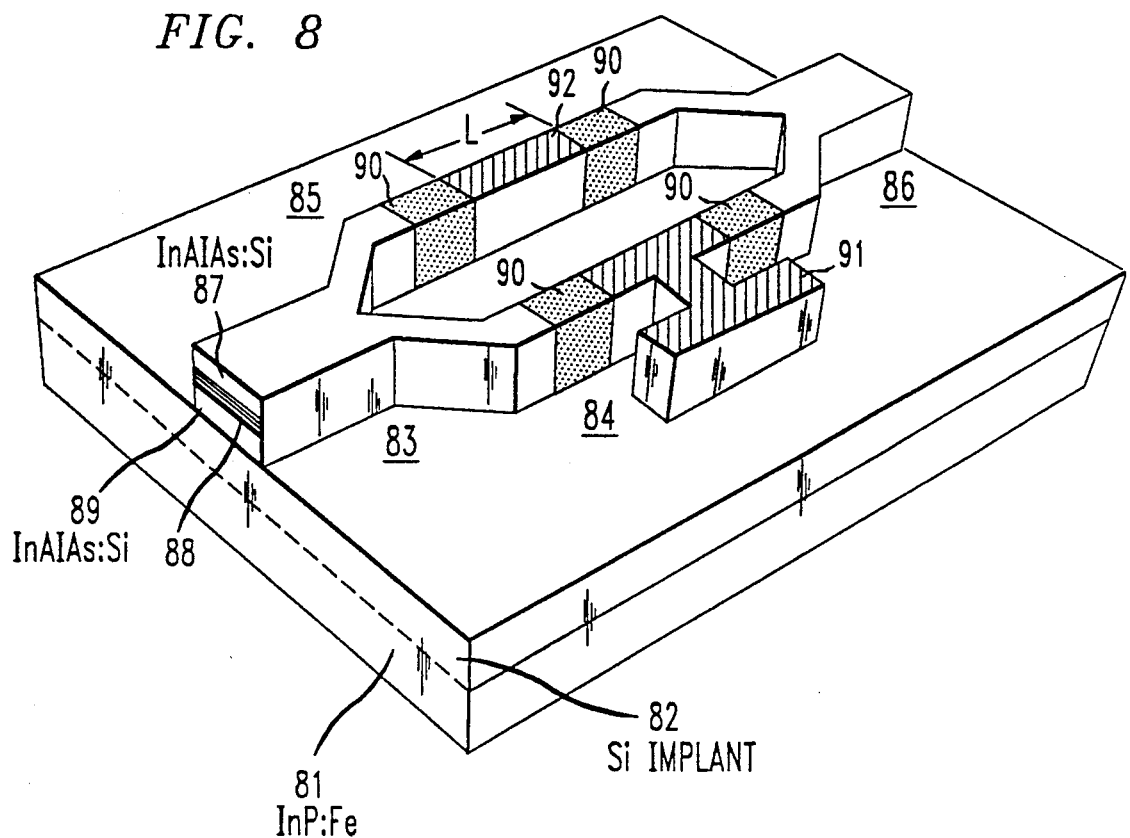
FIGS. 8 and 9 show simplified perspective and cross-sectional diagrams of a semiconductor embodiment for the external modulator shown in FIG. 1.
Figure 9:
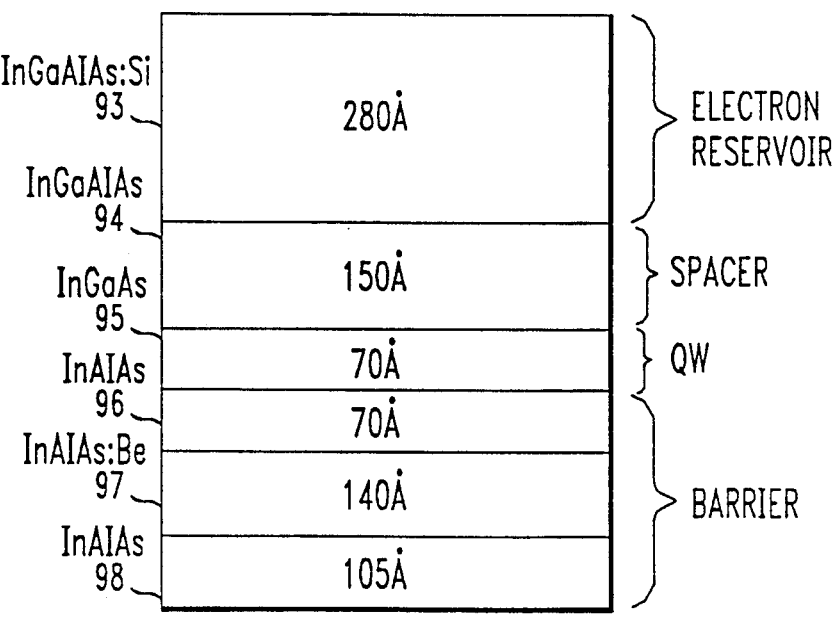

A semiconductor rib waveguide embodiment of the Mach-Zehnder interferometer external modulator is shown in FIG. 8. FIG. 9 shows details of one period for the quantum well structure within the waveguide. This external modulator is suitable for use in the system of FIG. 1 in accordance with the principles of the present invention.

The rib waveguide structure is grown by molecular beam epitaxy on a semi-insulating Fe-doped InP substrate 81 prepared by silicon ion implantation (350 keV, $5 \times 10^{14}$ cm$^{-2}$ activated at 775° C. for 15 sec.). Using standard etching techniques, a 2000 Å deep wet chemical etch is performed on the substrate to provide an n-type ground plane 82 approximately 1000 Å thick for easy isolation of individual devices and for reduction for parasitic capacities.

The rib waveguide structure includes silicon doped InAlAs cladding layers 87 and 89 and an electrooptically active waveguide core region 88. Upper cladding layer 87 has a thickness of approximately 4000 Å whereas lower cladding layer 89 has a thickness of approximately 2500 Å. Core region 88 comprises eight periods of a barrier, reservoir, and quantum well electron transfer structure (BRAQWETS) which is stackable. One period of the BRAQWETS is shown in FIG. 9 comprising electron reservoir 93, spacer layer 94, quantum well layer 95, and a barrier region. Electron reservoir 93 is a 280 Å thick layer of silicon doped InGaAlAs; spacer layer 94 is a 105 Å thick layer of InGaAlAs; quantum well layer 95 is a 70 Å thick layer of InGaAs; and the barrier region comprises InAlAs layer 96 having a thickness of 70 Å, Beryllium doped InAlAs layer 97 having a thickness of 140 Å, and InAlAs layer 98 having a thickness of 105 Å.

The Mach-Zehnder rib waveguide interferometer structure shown in FIG. 8 is defined by a wet chemical etching to have a rib width of approximately 5 μm and a height of approximately 1.465 μm. The transition region between the input waveguide 83 and either of the straight active portions of sections 84 and 85 is approximately 133.75 μm long. A similar dimension applies to the transition region between output waveguide 86 and the straight active portions of sections 84 and 85. The transition is accomplished via a 1 mm (radius of curvature) s-shaped waveguide bend to achieve a Y-branch angle of approximately 4° and a 9 μm center-to-center separation between parallel arms of the interferometer.

Electrical isolation is provided by helium ion implantation of a 5 μm region between the straight active portions of sections 84 and 85 and the adjacent Y-branch. An isolation of approximately 64MΩ between the two arms of the interferometer is accomplished by implanting a dose of $5 \times 10^{13}$ cm$^{-2}$ at 250 keV followed by annealing for 30 seconds at 450° C. Metallic contacts 91 and 92 fabricated from compositions such as standard chromium/gold are evaporated as shown over the straight active portions of sections 84 and 85. In addition, a metallic contact is formed over n-type layer 82 to contact the bottom groundplane.

The present invention is well suited for applications including optical fiber dispersion compensation, optical pulse compression, spread spectrum communications, and optical frequency and pulse generation. While the description above pertains wholly to a Mach-Zehnder interferometer structure for the external modulator, it is contemplated that other external modulator structures, either known now or developed in the future whose chirp parameter is controller, may be used. Certainly, other coplanar waveguide structures can be used for external modulation. Moreover, it is contemplated that a separate laser be associated with each waveguide to provide its CW output beam for subsequent modulation. In such an application, the optical beams produced by the separate lasers would be required to be at substantially the same optical frequency and be in a fixed phase relationship with respect to each other. Phase locking of the separate lasers provides the fixed phase relationship of the output optical beams.

In the example above, the output of the single laser source is split into two beams for the interferometer by a Y-branch splitter. Other apparatus such as a beam splitter or a directional coupler switch are contemplated for use in splitting a single output optical beam into multiple optical beams.

The waveguides employed in the external modulator have been described in the exemplary embodiment as single mode waveguides. It is contemplated that the separate waveguides can be replaced by a single waveguide supporting at least two modes, for example, a fundamental mode and a higher order mode. Generally, multimode waveguides are suitable for such an application.

The output of the individual waveguides is shown in the exemplary embodiments as being combined with a Y-branch combiner. It is contemplated that the combining of the optical beams can also be accomplished by using a 3 dB directional coupler switch or an ordinary beam splitter. It is further contemplated that the input beam splitting function and output beam combining function may be accomplished by any combination of beam splitting device and beam combining device, respectively, as described above.

While the embodiments described above employ waveguides which are substantially parallel, it is contemplated that any geometric relationship of the waveguides can be employed to achieve external modulation.

While the information modulated onto the optical beam is shown and described above as being substantially digital in nature, both analog and digital signals are contemplated for use with the present invention.

What is claimed is:

1. Apparatus for externally modulating an optical beam with information signal comprising:
   first and second waveguide means responsive to the optical beam, each waveguide means including an optical waveguide for supporting propagation of the optical beam and an electrode means for applying signals to the optical waveguide, the electrode means of the first waveguide means being substantially independent from the electrode means of the second waveguide means;
   waveguide output means for combining a modulated optical beam from each of said first and second waveguide means into a single modulated optical beam; and
   means responsive to the information for modifying the information to generate first and second modulation control signals, each said modulation control signal including a representation of the information signal, the first and second modulation control signals generated in a predetermined relationship to each other for inducing a predetermined non-zero amount of a modulation chirp parameter in the single modulated optical beam when the first and second modulation control signals are applied to the electrodes of the first and second waveguide means, respectively.

2. The apparatus as defined in claim 1 further including waveguide input means for directing the optical beam to each of said first and second waveguide means.

3. The apparatus as defined in claim 2 wherein said waveguide input means is selected from the group consisting of a Y-branch waveguide splitter element, a directional coupler switch, and a beam splitter element.

4. The apparatus ad defined in claim 2 wherein said waveguide output means is selected from the group consisting of a Y-branch waveguide combiner element, a directional coupler switch, and a beam combiner element.

5. The apparatus as defined in claim 1 wherein the predetermined relationship is characterized as the difference between peak-to-peak voltages differences, $\Delta V_A$ and $\Delta V_B$, for the first and second modulation control signals, respectively, and sum of peak-to-peak voltage differences for the first and second modulation control signals so that the modulation chirp parameter $\alpha_m$ is expressed as follows: $\alpha_m = (\Delta V_A + \Delta V_b)/(\Delta V_A - \Delta V_B)$.

6. Apparatus for generating a modulated optical beam carrying information comprising:
   optical waveguide means responsive to a modulation control signal for modulating a characteristic of an optical beam to carry said information wherein the optical waveguide means includes an interferometric optical modulator element having separately addressable interferometer arms each arm connected to the controlling means; and
   means for controlling the optical waveguide means to produce the modulated optical beam by generating the modulation control signal to modulate a replica of said information onto the characteristic of said optical beam wherein the modulation control signal comprises first and second signals supplied to different arms of the modulator element and for simultaneously controlling the optical waveguide means to generate the modulated optical beam exhibiting a substantially fixed, predetermined, non-zero amount of a modulation chirp parameter $\alpha_m$.

7. The apparatus as defined in claim 6 wherein the difference between peak-to-peak voltages differences, $\Delta V_A$ and $\Delta V_B$, for the first and second signals, respectively, and sum of peak-to-peak voltage differences for the first and second signals are fixed in a predetermined relationship to generate the non-zero amount of the modulation chirp parameter $\alpha_m$ as follows: $\alpha_m = (\Delta V_A + \Delta V_B)/(\Delta V_A - \Delta V_B)$.

8. A lightwave transmitter comprising:
   a laser operated in a mode selected from the group consisting of a substantially continuous-wave mode and a pulsed mode for generating an optical beam;
   optical waveguide means responsive to a modulation control signal for modulating a characteristic of the optical beam to carry information wherein the optical waveguide means includes an interferometric optical modulator element having separately addressable interferometer arms each arm connected to the controlling means; and
   means for controlling the optical waveguide means to produce a modulated optical beam by generating the modulation control signal to modulate a replica of said information onto the characteristic of said optical beam wherein the modulation control signal comprises first and second signals supplied to different arms of the modulator element and for simultaneously controlling the optical waveguide means to generate the modulated optical beam exhibiting a substantially fixed, predetermined, non-zero amount of a modulation chirp parameter $\alpha_m$.

9. The lightwave transmitter as defined in claim 8 wherein the difference between peak-to-peak voltages differences, $\Delta V_A$ and $\Delta V_B$, for the first and second signals, respectively, and sum of peak-to-peak voltage differences for the first and second signals are fixed in a predetermined relationship to generate the non-zero amount of the modulation chirp parameter $\alpha_m$ as follows: $\alpha_m = (\Delta V_A + \Delta V_B)/(\Delta V_A - \Delta V_B)$.

10. The lightwave transmitter as defined in claim 8 wherein the optical waveguide means further includes means for isolating the laser from optical reflections propagating through the waveguide means toward the laser.

* * * * *